United States Patent [19]
Kosoburd

[11] Patent Number: 5,917,797
[45] Date of Patent: Jun. 29, 1999

[54] MULTI-BEAM OPTICAL PICKUP ASSEMBLY AND METHODS USING A COMPACT TWO-DIMENSIONAL ARRANGEMENT OF BEAMS

[75] Inventor: Baruch Kosoburd, Lodi, Israel

[73] Assignee: Zen Research NV, Curacao, Netherlands Antilles

[21] Appl. No.: 08/912,881

[22] Filed: Aug. 15, 1997

[51] Int. Cl.⁶ .................................................. G11B 7/00
[52] U.S. Cl. .................. 369/102; 369/44.23; 369/44.37; 369/112
[58] Field of Search ............... 369/102, 44.27, 369/44.28, 44.37, 112, 120, 122, 44.42, 44.23, 110

[56] References Cited

U.S. PATENT DOCUMENTS

| | | | |
|---|---|---|---|
| 3,573,471 | 4/1971 | Kolb | 250/219 |
| 3,582,183 | 6/1971 | Schmidt | 350/150 |
| 4,104,489 | 8/1978 | Satoh et al. | 179/100.3 |
| 4,283,777 | 8/1981 | Curry et al. | 369/32 |
| 4,449,212 | 5/1984 | Reno | 369/44 |
| 4,459,690 | 7/1984 | Corsover et al. | 369/44.13 |
| 4,460,988 | 7/1984 | Gordon | 369/32 |
| 4,462,095 | 7/1984 | Chen | 369/44 |
| 4,560,249 | 12/1985 | Nishiwaki et al. | 359/569 |
| 4,578,786 | 3/1986 | MacIntosh et al. | 369/44 |
| 4,633,455 | 12/1986 | Hudson | 369/45 |
| 4,720,825 | 1/1988 | Kokada | 369/46 |
| 4,731,772 | 3/1988 | Lee | 369/45 |
| 4,754,446 | 6/1988 | Reno | 369/112 |
| 4,831,613 | 5/1989 | Kanda | 369/109 |
| 4,890,272 | 12/1989 | Ando | 369/45 |
| 4,982,395 | 1/1991 | MacAnally | 369/44.37 |
| 5,081,617 | 1/1992 | Gelbart | 369/112 |
| 5,111,445 | 5/1992 | Psaltis et al. | 369/103 |
| 5,113,286 | 5/1992 | Morrison | 359/569 |
| 5,128,919 | 7/1992 | Narahara et al. | 369/97 |
| 5,140,577 | 8/1992 | Ohsato | 369/44.37 |
| 5,144,616 | 9/1992 | Yasukawa et al. | 369/122 |
| 5,212,572 | 5/1993 | Krantz et al. | 359/15 |
| 5,272,550 | 12/1993 | Dickson et al. | 369/103 |
| 5,295,125 | 3/1994 | Oonishi et al. | 369/44.29 |
| 5,426,623 | 6/1995 | Alon et al. | 369/32 |
| 5,457,670 | 10/1995 | Maeda et al. | 369/44.37 |
| 5,465,244 | 11/1995 | Kobayashi et al. | 369/50 |
| 5,483,511 | 1/1996 | Jewell et al. | 369/44.37 |
| 5,485,438 | 1/1996 | Koyama | 369/44.32 |
| 5,523,995 | 6/1996 | Lichtenberg et al. | 369/44.37 |
| 5,566,159 | 10/1996 | Shapira | 369/99 |
| 5,574,597 | 11/1996 | Kataoka | 359/569 |
| 5,586,096 | 12/1996 | Isobe et al. | 369/102 |
| 5,592,444 | 1/1997 | Alon et al. | 369/112 |
| 5,602,383 | 2/1997 | Takekoshi et al. | 250/201.5 |
| 5,608,716 | 3/1997 | Koyama et al. | 369/275.1 |
| 5,717,667 | 2/1998 | Horimai et al. | 369/44.23 |

FOREIGN PATENT DOCUMENTS

0441435A1  4/1991  European Pat. Off. .

OTHER PUBLICATIONS

Lee, Wai–Hon, "High efficiency multiple beam gratings", Applied Optics, vol. 18, pp. 2152–2158, Jul. 1, 1979.

Lee, Wai–Hon, "Binary Synthetic Holograms", Applied Optics, vol. 13, pp. 1677–1682, Jul., 1974.

Pohlmann, Ken C., "The Compact Disk Handbook", A–R Editions, Inc., Madison, Wisconsin(2d ed. 1992), pp. 107–119.

*Primary Examiner*—John W. Cabeca
*Assistant Examiner*—Kim-Kwok Chu
*Attorney, Agent, or Firm*—Fish & Neave; Nicola A. Pisano

[57] ABSTRACT

Apparatus and methods for reading an optical disk are provided that use a compact two-dimensional arrangement of beams, with each beam aligned with a track on an optical disk, to provide a compact assembly having a reduced degree of aberration of the outermost beams while maintaining specified minimum distances between the beams. A preferred embodiment uses a two-dimensional diffractive element to split an illumination beam into a plurality of reading beams aligned with the tracks in a two-dimensional arrangement. In an alternative embodiment, a two-dimensional diffractive element is used to stagger the beams so that some tracks on the disk are skipped, further reducing the area of the beams and increasing the number of tracks that may be read simultaneously.

30 Claims, 9 Drawing Sheets

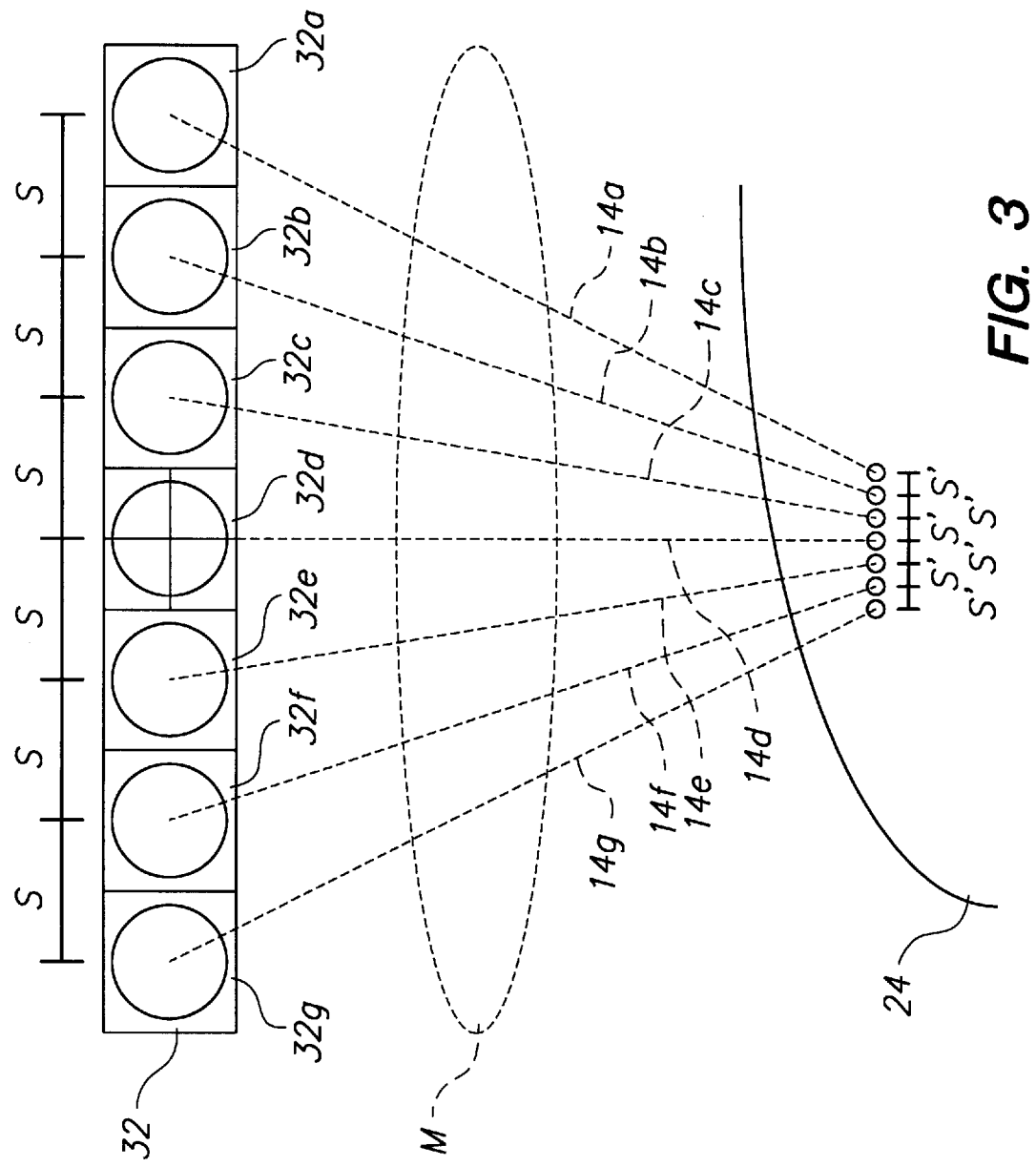

MULTI-BEAM OPTICAL PICKUP ASSEMBLY AND METHODS USING A COMPACT TWO-DIMENSIONAL ARRANGEMENT OF BEAMS

FIELD OF THE INVENTION

The present invention relates to apparatus and methods for simultaneously reading multiple tracks of an optical storage medium. More particularly, the invention relates to an optical pickup which uses a compact two-dimensional arrangement of multiple reading beams.

BACKGROUND OF THE INVENTION

In recent years, optical disks have become a standard medium for the distribution of digital data. Their relatively low cost and high storage density have led to their widespread use with personal computers. At present, almost every new personal computer system includes an optical disk drive capable of retrieving data from read-only optical disks (CD-ROM), and optical disks are rapidly becoming the distribution medium of choice for software publishers. With the cost of devices for reading and writing optical disks decreasing, and the amount of information which can be stored on a disk increasing, it seems likely that the popularity of optical disks for storing digital data will continue into the foreseeable future.

A typical optical "compact disk" (CD) includes a transparent plastic substrate having data encoded in pits that are impressed into the surface of the substrate along a spiral track. A metalization layer deposited on the pitted substrate provides a reflective surface, and a protective transparent layer is then deposited on the metalization layer. To read the data, an optical disk drive uses an optical pickup assembly which reflects a reading beam of coherent light off of the metalization layer of the disk and uses a detector to sense the intensity of the reflected light.

As the disk is rotated, pits along a data track sequentially pass under the spot projected onto the disk by the reading beam. The presence of a pit in the data track causes destructive interference to occur between light reflecting from the pit and light reflecting from the area surrounding the pit. The intensity of the reflected light is thus modulated by the pattern of data pits in the disk substrate.

The modulated, reflected light is directed to a detector that develops electronic signals corresponding to the intensity of the reflected light. These electronic signals are then demodulated by processing circuitry to recover the digital information stored on the optical disk. Further details regarding the construction and use of optical disk drives can be found in *Compact Disc Technology*, Nakajima, H. and Ogawa, H., translated by Aschmann, C., published by Ohmsha, Ltd., Japan (1992), and *The Compact Disc Handbook*, Pohlmann, K., 2nd ed., A-R Editions, 1992.

The increased availability of CD-ROM products, coupled with the availability of increasingly faster microprocessors, has created a demand for ever faster optical disk drives. As a result, optical disk drives capable of rotating the disk at multiples of the rotation speed of a standard single speed drive are becoming available. Drives which rotate the disk at speeds of 8 times and up to 12 times the speed of a standard single speed drive are currently available. In an 8X (eight times single speed) drive, for example, the disk is rotated at speeds up to 4800 rpm when reading the innermost data track, as compared to approximately 600 rpm for a single speed drive. The ability to achieve even greater speeds using this method may soon be limited by the ability to provide low-cost, easily manufacturable drives. The use of greater disk rotational speeds requires optical drive designs which are more sophisticated, and require tighter manufacturing tolerances. This results in drives which are more expensive to design and produce than previous optical disk drives.

A cost effective alternative to increasing the disk rotational speed to provide faster optical disk drives is to read multiple data tracks simultaneously, as described in commonly assigned U.S. Pat. No. 5,426,623 to Alon et al., the entirety of which is incorporated herein by reference. In accordance with the methods and apparatus provided therein, for example, ten adjacent data tracks may be read simultaneously. Thus, even if the disk is rotated at only four times the standard speed (i.e., a 4X drive is used), the capability to read ten tracks simultaneously provides the equivalent of a 40X drive.

It should be noted that as used herein, a data track is a portion of the spiral data track of a typical optical compact disk which follows the spiral for one rotation of the disk. Thus, a drive capable of reading multiple data tracks simultaneously reads multiple such portions of the spiral data track at once. For optical disks having concentric circular tracks, a data track would refer to one such circular track. For disks having multiple concentric spiral tracks, such as those described in commonly assigned, copending U.S. patent application Ser. No. 08/885,425, a data track would refer to one of the concentric spiral tracks.

One way in which a drive capable of reading multiple data tracks simultaneously may be implemented is through use of multiple beams, arranged so that each beam illuminates a single data track on the disk. U.S. Pat. No. 5,144,616 to Yasukawa et al. shows a system in which multiple laser diode emitters are used to provide multiple beams. Other methods may also be used to provide multiple beams. U.S. Pat. No. 4,459,690 to Corsover, for example, describes a multi-beam system in which an illumination beam generated by a single laser source is split into multiple beams using an acousto-optic device that dithers the beam in a direction normal to the track direction.

The beams in a multi-beam optical pickup may also be provided by using a diffractive element to split a single beam into multiple beams. This technique is used to generate the beams in a three-beam tracking system, as shown in *The Compact Disc Handbook*, Pohlmann, K., 2nd ed., A-R Editions, 1992, pp. 108–115. In commonly assigned U.S. patent application Ser. No. 08/911,815, filed concurrently herewith, a diffractive element is used to split an illumination beam into a plurality of co-linear reading beams. Through careful design, it is possible to produce a diffractive element capable of generating multiple beams having the proper spacing to align with-the data tracks of an optical disk. A holographic element, such as the one described in U.S. Pat. No. 5,272,550, to Dickson et al. could also be used to achieve this effect.

In addition to being aligned with the data tracks, the beams in a multi-beam optical pickup must be maintained at specified distances from each other to avoid crosstalk between data tracks, and to properly align the beams with detectors. These distances are determined by the spacing of the tracks on the optical disk, the magnification of the optics, and the size and spacing of the detectors which are used to read the information. The necessary spacing between beams can be decreased by increasing the magnification of the optics or by decreasing the size and spacing of the detectors. Increasing the magnification of the optics reduces the optical efficiency of the system, and reducing the size of the detectors makes them less effective, and more costly to manufacture. The spacing of the beams in a multi-beam system represents a tradeoff between these factors. If the size, sensitivity, and cost of photodetectors improve in the future, it may be possible to reduce the spacing between the beams.

The multi-beam system described in the above-referenced U.S. patent application Ser. No. 08/911,815 (ZRI-011) has its plurality of reading beams arranged in a single row. This row is typically angled with respect to the radial direction of the disk, often by an angle greater than 85 degrees, to maintain the needed distances between spots projected onto the surface of the disk as determined by the beam spacing. As more beams are used to read more data tracks simultaneously, the row of beams becomes longer, taking up a larger portion of the area which is picked up by the optics (hereinafter referred to as the field of view). Points near the outer extremes of the field of view of an optical system suffer increased optical aberrations compared to points near the center of the field of view. The outermost beams may also suffer from vignetting, causing less of their energy to reach the detectors. The size of the field of view, and the degree of aberration and vignetting at the edges of the field of view place a practical upper limit on the number of data tracks which may be read simultaneously using multiple beams. Increasing the field of view of the optics to reduce the aberration and vignetting increases the cost, and reduces the optical efficiency of the system.

It would therefore be desirable to reduce the field of view required to pick up all of the beams in a multi-beam optical disk drive system, while maintaining or increasing the number of beams, and maintaining specified minimum distances between the beams. Achieving this goal would reduce the degree of optical aberration and vignetting affecting the outer beams, increase optical efficiency and performance, and enable optical disk drives to be manufactured that can simultaneously read a greater number of data tracks than previously known multi-beam systems.

SUMMARY OF THE INVENTION

In view of the foregoing, it is an object of the present invention to provide a multi-beam optical pickup in which the field of view necessary to encompass all of the beams is reduced while the number of beams is unchanged or increased, and specified minimum distances between spots projected by the beams onto the surface of an optical disk are maintained.

These and other objects of the invention are accomplished by providing an optical pickup which uses a compact two-dimensional placement of the beams wherein the beams are arranged in two or more rows, are aligned with data tracks on an optical disk, and are spaced at specified minimum distances from each other. As used herein, an arrangement of beams along two or more rows means that at least one beam in the arrangement is not collinear with the others. Thus, any two dimensional arrangement can be achieved, including multiple lines, zigzags, and circular patterns. Such patterns may be generated by an optical pickup which uses a two-dimensional diffractive or holographic element to split a single illumination beam into a plurality of reading beams, or which uses a plurality of laser diodes, spaced to produce the desired arrangement of beams.

In a preferred embodiment, an optical pickup assembly is provided which uses a diffractive element, more specifically a high efficiency two-dimensional Dammann grating (also known as a binary phase grating) to split a beam so that spots are projected onto the surface of an optical disk in two rows of six spots per row, each spot corresponding to the location of a data track on the optical disk. When used with a detector having a minimum distance of 66.6 microns between the centers of adjacent photodetector elements and an optical system having a magnification factor of 5.5, the spots in such a system are separated from each other by a distance of at least 12.1 microns (as projected onto the optical disk). This embodiment enables twelve adjacent tracks to be read simultaneously while the diameter of the field of view subtended by the array of beams is reduced by approximately seven percent with respect to a multi-beam optical pickup system in which seven spots are arranged in a single row with the same spacing between the spots.

An alternative embodiment employs a two-dimensional Dammann grating to split a beam so that spots are projected on the surface of an optical disk in two widely-spaced rows of five spots per row. In a system having a minimum distance between detectors of 70 microns and magnification factor of 5.5, the spots are separated from each other on the optical disk by a distance of at least 12.7 microns. This embodiment therefore enables two non-adjacent sets of five adjacent data tracks to be read in one rotation of the disk, or twenty adjacent data tracks to be read in two rotations, while reducing the diameter of the field of view by approximately thirty-seven percent with respect to a multi-beam optical pickup system in which seven spots are arranged in a single row with the same minimum spacing between the spots.

Other embodiments in which three or four groups of five adjacent spots per group with five adjacent tracks skipped between groups are also disclosed. These embodiments are capable of reading thirty and forty adjacent tracks, respectively, in two rotations of the optical disk, while requiring a field of view no larger than that needed by a multi-beam optical pickup system in which seven spots are arranged in a single row with the same minimum spacing between the spots.

BRIEF DESCRIPTION OF THE DRAWINGS

The above and other objects of the invention will be apparent upon consideration of the following detailed description, taken in conjunction with the accompanying drawings, in which:

FIG. 3 shows the spacing between photodetectors, and a resultant spacing between spots projected on an optical disk;

DETAILED DESCRIPTION OF THE INVENTION

Figure 1:
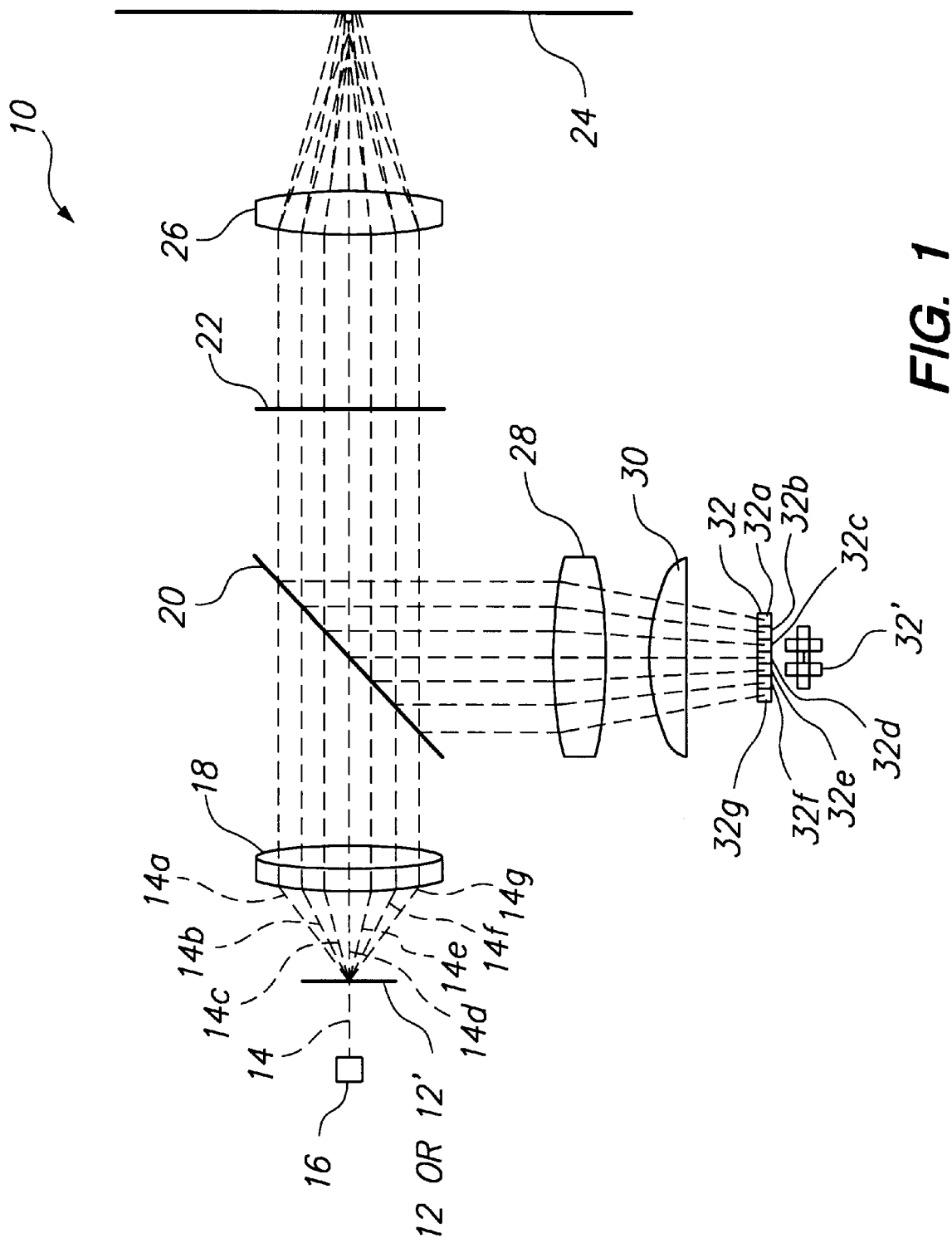
FIG. 1 is a schematic view of the optical path of an illustrative multi-beam optical disk reading apparatus suitable for practicing the present invention.

Referring to FIG. 1, an illustrative schematic of optical disk reading apparatus 10 suitable for use in accordance with the present invention is described. Optical disk reading apparatus 10 employs one-dimensional diffraction grating 12 to split illumination beam 14 into a plurality of reading beams 14a–14g for simultaneously reading multiple data tracks of an optical disk. Illumination beam 14 is generated by semiconductor laser diode 16, and passes through one-dimensional diffraction grating 12, where it is split into co-linear reading beams 14a–14g. Beams 14a–14g are made parallel by collimator lens 18, and pass through polarization beamsplitter 20. Beams 14a–14g then pass through quarter-wavelength plate 22, which rotates the polarity of the light. Beams 14a–14g are focussed onto data tracks on optical disk 24 by objective lens 26.

Optical disk 24 reflects beams 14a–14g back towards objective lens 26, with the intensity of the respective beams modulated by the data pits on optical disk 24. The reflected beams 14a–14g pass through objective lens 26 and quarter-wavelength plate 22, and are deflected towards photodetector 32 by polarization beamsplitter 20 and through condenser lens 28 and cylindrical lens 30. Cylindrical lens 30 focusses reading beams onto corresponding elements 32a–32g of photodetector 32. Photodetector element 32d preferably comprises a quadrant focus detector, which is used, along with cylindrical lens 30, to introduce astigmatism that provides a focus error signal.

Optical disk reading apparatus 10 of FIG. 1 is similar to that disclosed in concurrently filed U.S. patent application Ser. No. 08/911,815 (ZRI-011), except that the apparatus of FIG. 1 employs polarized beamsplitter 20 and quarter wave plate 20, rather than a hologram grating, to deflect the reading beams reflected from the optical disk surface to the photodetector. In the context of the present invention, it is contemplated that at least laser diode 16, grating 12 or 12' (discussed hereinafter), beamsplitter 20 (or equivalent) and photodetector 32 will be combined into a single package, referred to hereinafter as an "optical pickup assembly," similar to that described in the above-referenced patent application.

Figure 2:
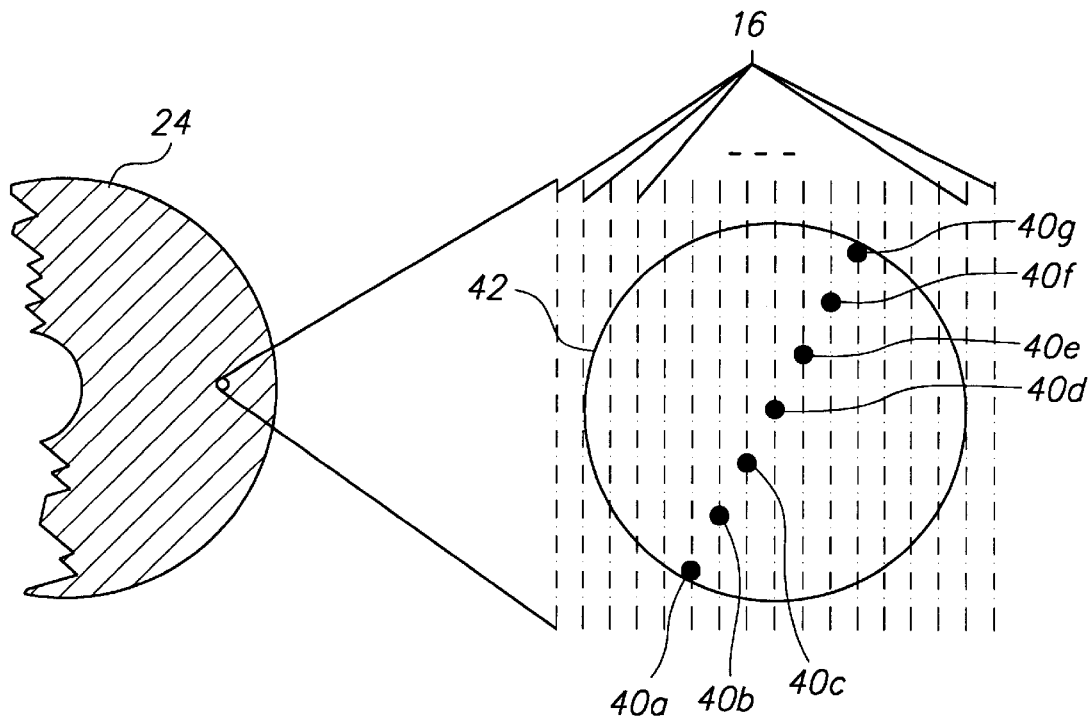
FIG. 2 depicts the arrangement of spots projected onto the surface of an optical disk by the multi-beam optical reading apparatus of FIG. 1.

Referring now to FIG. 2, the spacing of spots 40a–40g projected onto optical disk 24 by beams 14a–14g using optical disk reading apparatus 10 is described. Spots 40a–40g are aligned with data tracks 16 of disk 24, and form a row inclined at an angle with respect to the radial direction of optical disk 24, so that specified distances are maintained between spots 40a–40g. Referring to FIG. 3, in an optical disk reading apparatus like the one used with the preferred embodiments of the present invention, an optical magnification M of approximately 5.5, and a spacing between detector centers S of approximately 66.6 microns gives a spacing S' of 12.1 microns between the spots when imaged onto optical disk 24.

Circle 42 of FIG. 2 represents the minimum field of view containing all of spots 40a–40g. As this field of view is expanded, the degree of optical aberration and vignetting of the outermost spots increases, placing a practical upper limit on the number of tracks which may be read simultaneously using the apparatus of FIG. 1 as described hereinabove.

Figure 4:
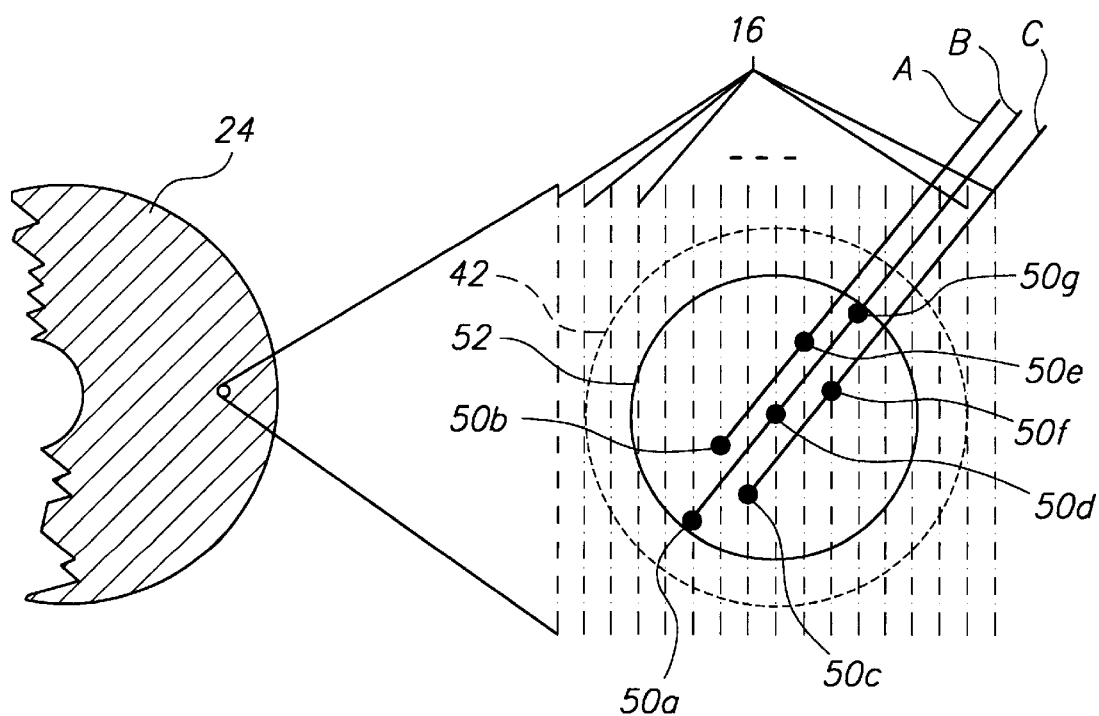
FIG. 4 depicts an illustrative arrangement of spots generated in accordance with the principles of the present invention.

In accordance with the principles of the present invention, the spots could be arranged in a more compact two-dimensional configuration, wherein the spots are staggered between multiple rows, as shown in FIG. 4. In FIG. 4, spots 50a–50g are aligned with data tracks 16, and for a given detector width and optical magnification, will maintain the same spacing as the spots in FIG. 2. However, because the spots are arranged in three rows A–C, rather than the single row as in FIG. 2, circle 52, representing the field of view necessary to contain spots 50a–50g, has an area more than 45% smaller than circle 42.

Such a staggered arrangement could illustratively be generated by splitting an illumination beam into multiple reading beams with a two-dimensional beamsplitter, such as a two-dimensional diffractive element or a two-dimensional holographic element. For example, referring now to FIGS. 1 and 4, in accordance with the present invention, grating 12 and detector 32 of the optical pickup assembly of optical disk reading apparatus 10 are replaced with two-dimensional grating 12' and detector 32'. Two-dimensional grating 12' splits the reading beams into two or more rows, while detector 32' has its elements aligned to receive illumination reflected from the optical disk surface from the two or more rows of reading beams.

Substitution of one-dimensional grating 12 of optical disk reading apparatus 10 with a two-dimensional diffraction grating permits the illumination beam to be split into a plurality of reading beams arranged in two or more rows. In accordance with the present invention, a two-dimensional arrangement of reading beams may be generated which is more compact, and includes more reading beams, than could be produced using a one-dimensional arrangement of the beams. Of course, the number and placement of the elements of photodetector 32' within the optical pickup assembly must also be altered to align each element with a corresponding reflected beam.

Figure 5A:
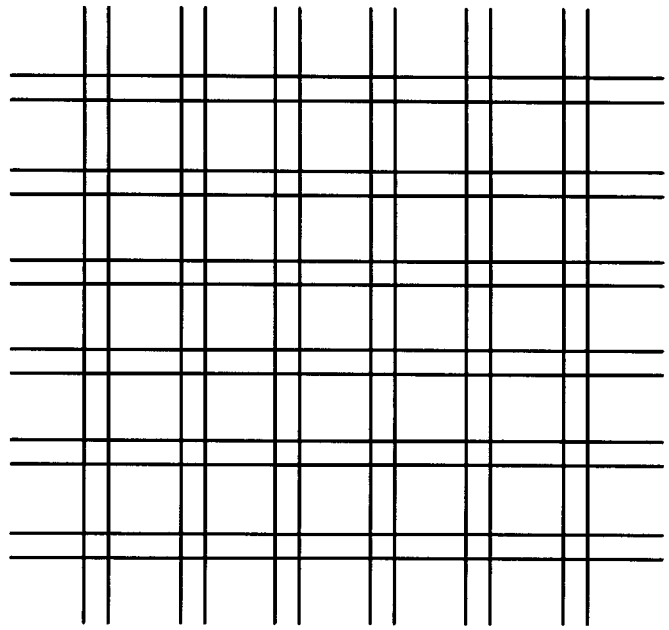
FIGS. 5A and 5B show, respectively, a typical orthogonal periodic structure of a two-dimensional Dammann grating, and a "skewed" structure of a two-dimensional Dammann grating for use in an optical pickup built in accordance with the principles of the present invention.
Figure 5B:
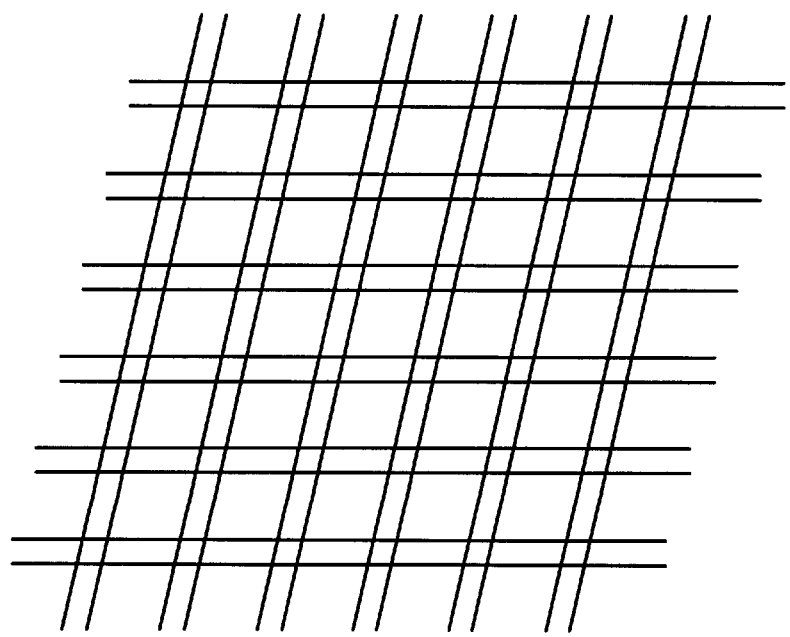

A preferred embodiment of the optical pickup assembly of the present invention generates two-dimensional arrangements of spots by using a diffractive element to split an illumination beam into multiple reading beams. The two-dimensional diffractive element used in the optical pickup assembly of the present invention preferably comprises a two-dimensional Dammann grating, also referred to as a binary phase grating. Design and manufacture of binary phase gratings for splitting a beam is taught, for example, in U.S. Pat. No. 5,113,286, to Morrison and U.S. Pat. No. 5,574,597, to Kataoka, which are incorporated herein by reference. U.S. Pat. No. 5,113,286 describes binary phase gratings that produce an array of spots for use in optical logic devices, such as optical crossover networks, as well as methods for designing and producing such gratings. U.S. Pat. No. 5,574,597, to Kataoka, shows a binary phase grating generating multiple beams of substantially uniform intensity with high efficiency of light utilization. Further details of binary phase gratings also may be found in H. Dammann and K. Gortler, "High-Efficiency In-Line Multiple Imaging by Means of Multiple Phase Holograms", Opt. Comm., 3, 312–315 (1971), and H. Dammann and E. Klotz, "Coherent Optical Generation and Inspection of Two-Dimensional Periodic Structures", Optica Acta 24, 505–515 (1977). It should be noted that in a typical two-dimensional Dammann grating, the slits of the grating have a periodic structure such as the one shown in FIG. 5A, where the intersecting slits are orthogonal. A Dammann grating used in the present invention may have a periodic structure such as shown in FIG. 5B, in which the intersecting slits are not orthogonal, producing skewed rows of beams. It will be apparent to one skilled in the art that other types of diffractive elements, or holographic elements, such as the one shown in U.S. Pat. No. 5,272,550, to Dickson et al., incorporated herein by reference, could be used instead of a Dammann grating to split an illumination beam into a plurality of reading beams aligned in a two-dimensional arrangement.

Figure 6:
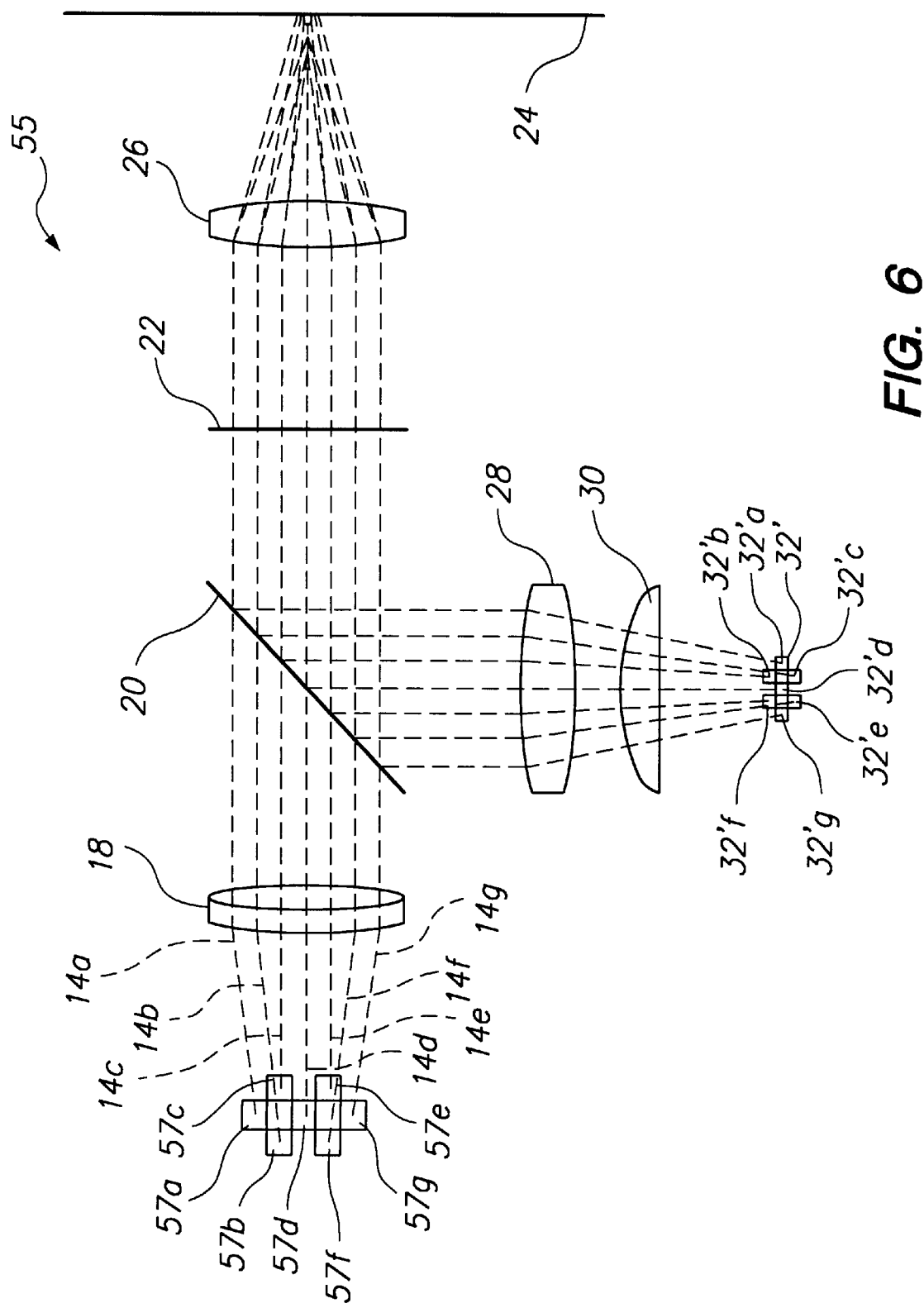
FIG. 6 shows an optical pickup which uses an array of laser diodes to generate an arrangement of beams in accordance with the principles of the present invention.

Alternatively, instead of using a two-dimensional diffractive or holographic element to split an illumination beam into a plurality of reading beams, a plurality of laser diodes may be used to generate the plurality of reading beams. FIG. 6 shows an optical pickup which uses an array of laser diodes, arranged to produce a two-dimensional pattern of spots as shown in FIG. 4. In optical pickup 55 of FIG. 6, the reading beams are directly produced by laser diodes 57a–57g, rather than being generated from a single beam by a diffractive or holographic element.

In a preferred embodiment of the present invention, Dammann gratings are used to split a single beam into multiple beams of approximately equal intensity. A one-dimensional Dammann grating having, for instance, seven orders will split a beam into seven beams of substantially equal intensity arranged in a single row. A two-dimensional Dammann grating can split a beam into multiple beams of approximately equal intensity arranged along two or more rows.

It will be apparent to one skilled in the art that the effect of a two-dimensional Dammann grating may be substantially achieved by combining two one-dimensional Dammann gratings, arranged so that the slits on the gratings are nonparallel. A beam passing through a first grating is split into a plurality of beams aligned along a first row. When these beams pass through a second grating, each of the beams is split into a plurality of beams aligned along a second row at an angle with respect to the first row produced by the first grating.

Figure 7A:
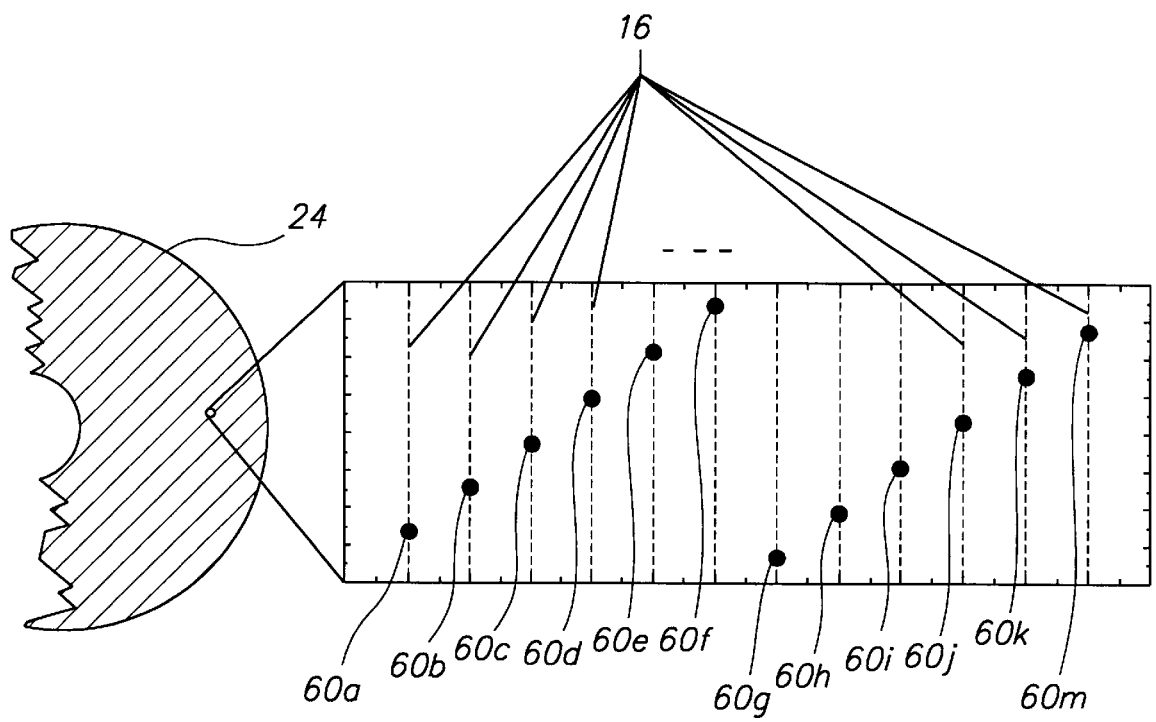
FIGS. 7A and 7B show, respectively, the arrangement of spots on an optical disk surface generated by apparatus constructed in accordance with the present invention and an arrangement of spots as they appear in the field of view of the optical system of the apparatus constructed in accordance with the present invention.
Figure 7B:
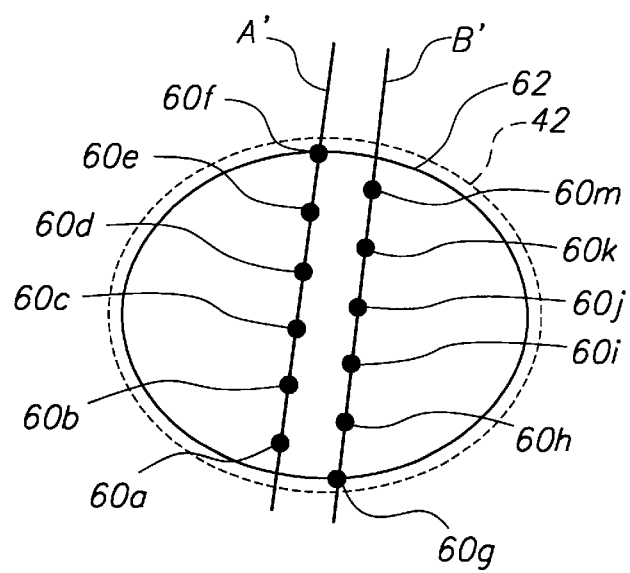

Referring now to FIGS. 7A and 7B, a first preferred embodiment of the optical pickup assembly of the present invention is described in which a twelve order two-dimensional diffraction grating is used to split an illumination beam into twelve reading beams, arranged along two rows A' and B' spaced apart from one another. As shown in FIG. 7A, when these beams pass through the optics of a multi-beam optical disk reading apparatus, such as that of FIG. 1, they project spots 60a–60m onto the surface of optical disk 24. Spots 60a–60m are aligned with data tracks 16 on optical disk 24, and in one embodiment having a detector width of 66.6 microns and optical magnification of 5.5, preferably have a minimum spacing between spots of 12.1 microns. Such an arrangement (with appropriate alignment of the photodetector elements) enables the optical disk reading apparatus to read twelve adjacent data tracks per rotation of optical disk 24.

Circle 62 in FIG. 7B represents the field of view of the optical disk reading apparatus, and contains all twelve spots. Circle 62 has a diameter approximately seven percent smaller than the diameter of circle 42, which represents the required field of view for only seven spots arranged along a single row with the same spacing between spots. Thus, the present invention enables a greater number of tracks to be read simultaneously with a smaller field of view than could be achieved using a one-dimensional arrangement of spots.

The two-dimensional Dammann grating employed to generate the reading beam pattern of FIG. 7A may be advantageously implemented using two one-dimensional Dammann gratings, a first grating with two orders, and a second grating with six orders that is preferably arranged so that the slits of the respective gratings intersect at an angle of 60.1 degrees. A beam of light passing through the first grating is split into two beams, each of which is then split into six beams when it passes through the second grating, thus providing a total of twelve beams arranged in two spaced apart rows of six beams per row.

Figure 8A:
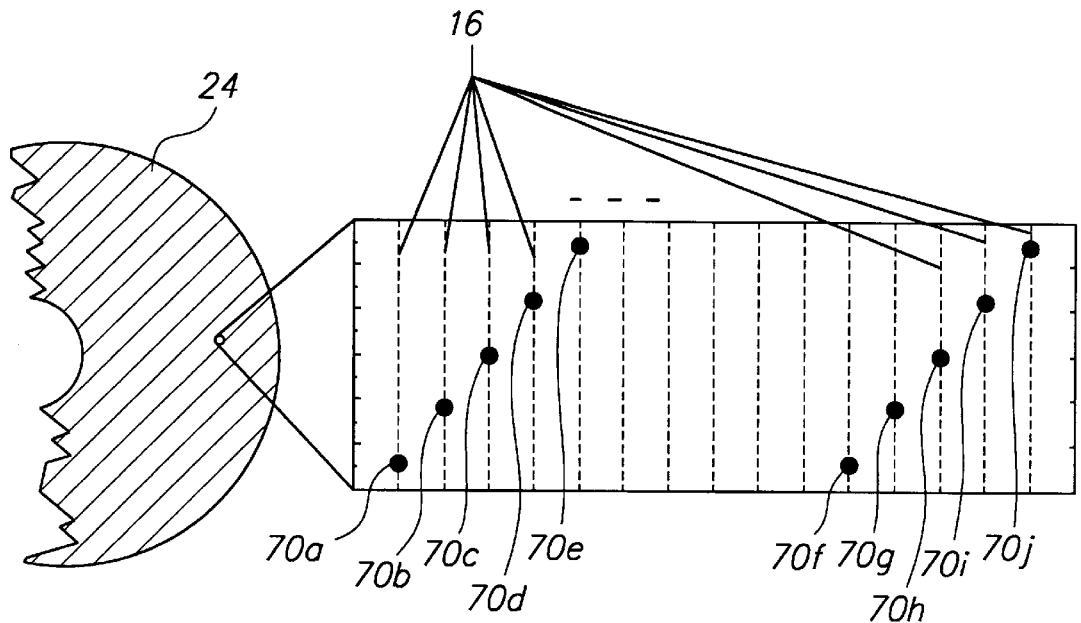
FIGS. 8A–B, 9A–B, and 10A–B show views similar to FIGS. 7A and 7B of alternative embodiments of the present invention having a staggered arrangement of spots in which groups of adjacent illuminated tracks are separated by groups of adjacent non-illuminated tracks.
Figure 8B:
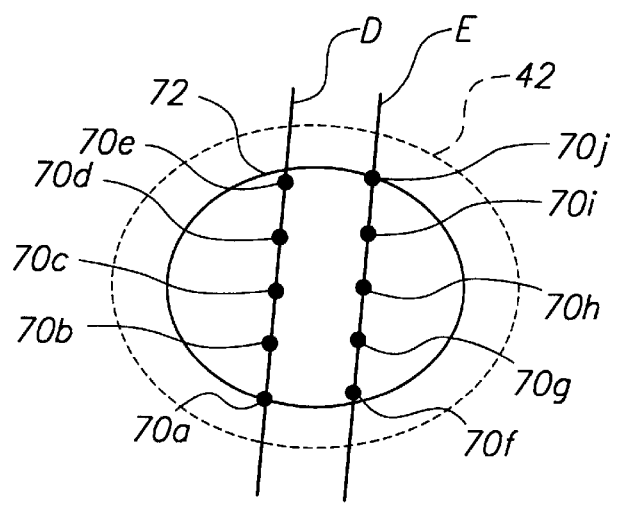

Referring now to FIGS. 8A and 8B, an alternative embodiment of the optical pickup assembly of the present invention is described. In this embodiment, grating 12 of FIG. 1 is replaced by a ten order two-dimensional Dammann grating, or two one-dimensional Dammann gratings (the first grating having two orders, the second grating having five orders) that split the illumination beam into ten reading beams aligned in two spaced apart rows D and E with a specified minimum inter-spot spacing. When the reading beams are projected onto optical disk 24, spots 70a–70j are aligned with data tracks 16, with an intervening gap of five tracks between the two rows of spots. The arrangement of FIG. 8A therefore enables two non-adjacent groups of five adjacent tracks per group to be read in one rotation of the disk, or twenty adjacent tracks to be read in two rotations of the disk.

The arrangement of spots 70a–70j in FIG. 8, in which certain intervening tracks are skipped, enables a substantial reduction in the field of view required to cover all of the spots. As shown in FIG. 8B, circle 72, which represents the field of view required to cover spots 70a–70j, is substantially smaller than circle 42, which represents the field of view required to cover seven spots arranged in a single row with the same inter-spot spacing. In this alternative embodiment, the reduction in the diameter of the field of view is approximately thirty-seven percent.

Figure 9A:
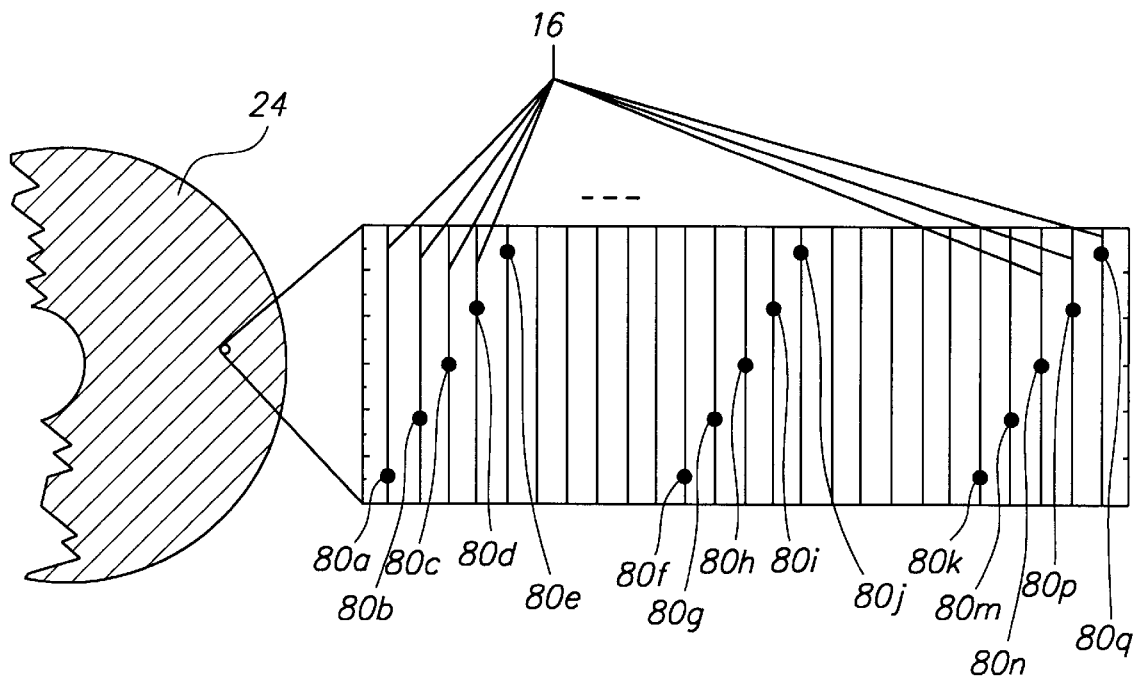
Figure 9B:
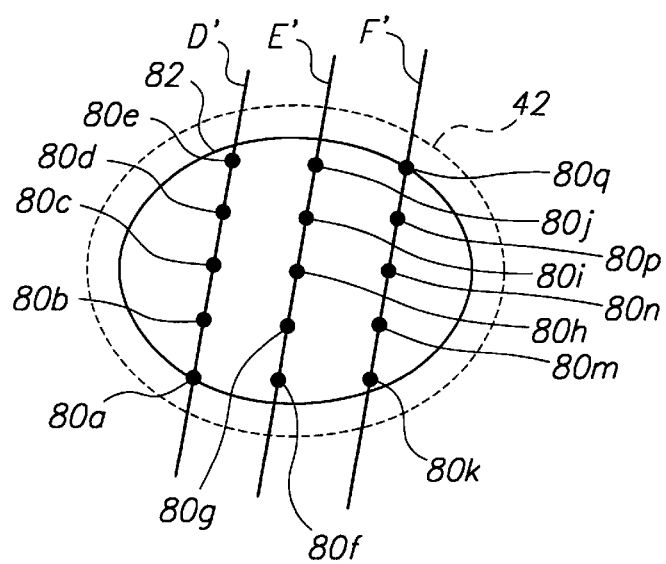

FIGS. 9A and 9B show a similar embodiment, in which three groups of five spots per group are used to read fifteen data tracks from the disk simultaneously. Five tracks are skipped between each of the groups of five spots. To achieve this arrangement, grating 12 of FIG. 1 is replaced by a fifteen order two-dimensional Dammann grating, or two one-dimensional Dammann gratings (the first grating having three orders, the second grating having five orders) that split the illumination beam into fifteen reading beams aligned in three spaced apart rows D' and E' and F' with a specified minimum inter-spot spacing. The arrangement of FIG. 9A therefore enables three non-adjacent groups of five adjacent tracks per group to be read in one rotation of the disk, or thirty adjacent tracks to be read in two rotations of the disk.

As shown in FIG. 9B, circle 82, which represents the field of view required to cover spots 80a–80q, is smaller than circle 42, which represents the field of view required to cover seven spots arranged in a single row with the same minimum inter-spot spacing. In this alternative embodiment, the reduction in the diameter of the field of view is approximately eighteen percent.

Figure 10A:
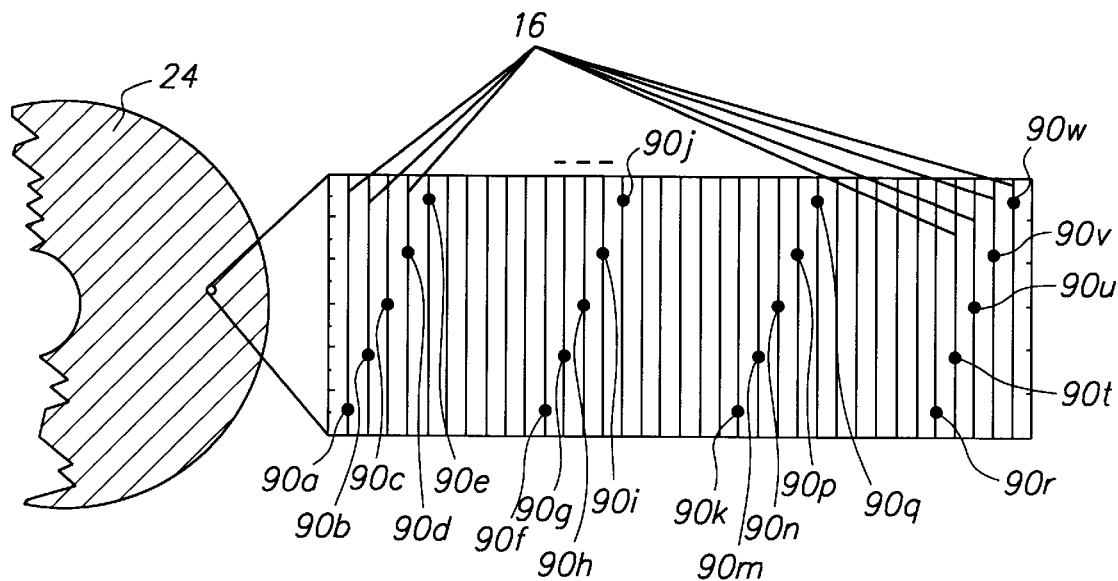
Figure 10B:
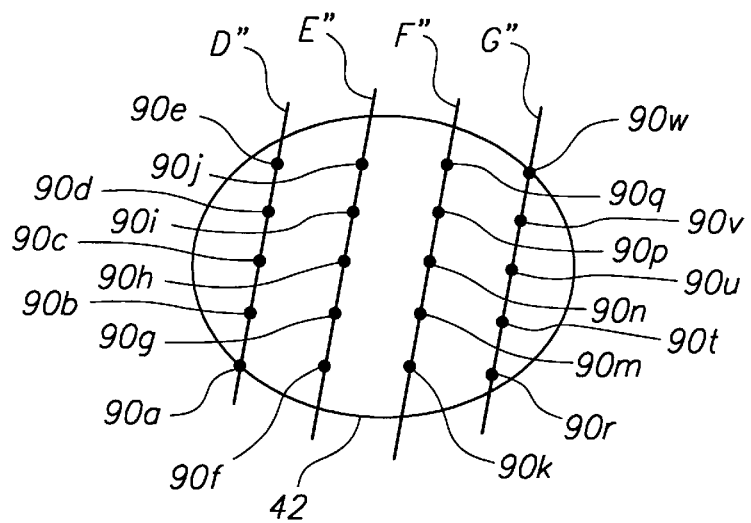

In FIGS. 10A and 10B, another similar preferred embodiment is shown, in which twenty tracks, in four non-adjacent groups of five adjacent tracks per group are read. The pattern of spots shown in FIGS. 10A and 10B are preferably generated by replacing grating 12 of FIG. 1 with a twenty order two-dimensional Dammann Grating (or two one-dimensional Dammann gratings, the first having four orders, the second having five orders). An optical pickup using this arrangement could read twenty non-adjacent tracks in one rotation of the optical disk, or forty adjacent tracks in two rotations.

The field of view encompassing all twenty spots 90a–w, as shown in FIG. 10B has the same diameter as circle 42, representing the field of view required to cover seven spots arranged in a line with the same minimum distance between the spots.

In an optical pickup using an arrangement of beams such as that shown in FIGS. 9A–B and 10A–B, in which many tracks are read simultaneously, it may be necessary to add additional optics and circuitry to the optical pickup to correct for minor variations in the track pitch of a typical optical disk which can lead to misalignment of the beams with the tracks of the disk, or with the detector elements. The CD-ROM specification, for example, provides for a track pitch of 1.5±0.1 microns. A track pitch variation of 0.1 micron can add up to 35 microns of variation across thirty-five tracks (the span of the embodiment of FIG. 10). Additionally, the magnification of the system can vary due to such things as manufacturing tolerances, temperature changes, and component aging. Minor variation in the magnification can also lead to the beams being misaligned with the tracks and the detector elements. Such misalignment and magnification errors would have the greatest effect in systems such as those discussed with reference to FIGS. 9A–B and 10A–B, in which many tracks are read at once.

Minor misalignment and magnification errors can be corrected through the use of additional optical and electronic components in the optical pickup assembly to detect and correct the errors. Such a system is described in commonly assigned, co-pending U.S. patent application Ser. No. 08/675,526, filed Jul. 3, 1996. The methods described therein could be employed in the optical pickup assembly of the present invention to correct for misalignment and magnification errors.

While preferred illustrative embodiments of the present invention are described, it will be apparent to one skilled in the art that various changes and modifications may be made therein without departing from the invention. Examples of such modifications include, but are not limited to, changing the number or spacing of the reading beams, changing the arrangement or composition of the optics in the pickup assembly, changing the arrangement or composition of the detector elements of the pickup assembly, using some other type of light source, or some other type of diffractive, holographic, or optical element to generate a plurality of reading beams with an arrangement substantially similar to that shown in the present invention. These and other modifications are considered within the scope of the invention, which is limited only by the claims which follow.

What is claimed is:

1. An optical pickup assembly for use with an objective lens in optical disk reading apparatus for simultaneously reading a plurality of data tracks of an optical storage medium, the optical pickup assembly comprising:

a light source which generates an illumination beam;

a two-dimensional beamsplitter that splits the illumination beam into a plurality of reading beams, the plurality of reading beams aligned in at least two non-collinear rows of reading beams, the objective lens focusing the plurality of reading beams onto a surface of the optical storage medium so that each one of the plurality of reading beams is aligned with a corresponding one of the data tracks; and a plurality of detector elements, each one of the plurality of detector elements aligned to receive a respective one of the plurality of reading beams reflected from the surface of the optical storage medium, each one of the plurality of detector elements generating a data signal representing data stored in the corresponding data track.

2. The optical pickup assembly of claim 1, wherein the two-dimensional beamsplitter comprises a two-dimensional diffractive element.

3. The optical pickup assembly as defined in claim 2, wherein the diffractive element comprises a two-dimensional Dammann grating.

4. The optical pickup assembly as defined in claim 3, wherein the two dimensional Dammann grating has a periodic structure in which the intersecting slits are not orthogonal, producing skewed rows of beams.

5. The optical pickup assembly as defined in claim 2 wherein the two-dimensional diffractive element comprises first and second one-dimensional diffractive elements, the first and second one-dimensional diffractive elements aligned so that an illumination beam passing through the first one-dimensional diffractive element is split into a first plurality of beams, each one of the first plurality of beams being further split into a second plurality of reading beams upon passing through the second one-dimensional diffractive element.

6. The optical pickup assembly as defined in claim 5 wherein the first one-dimensional diffractive element comprises a one-dimensional Dammann grating having a first number of diffractive orders, and the second one-dimensional diffractive element comprises a one-dimensional Dammann grating having a second number of diffractive orders.

7. The optical pickup assembly as defined in claim 6, wherein the first number of diffractive orders is two and the second number of diffractive orders is six.

8. The optical pickup assembly of claim 1, wherein the two-dimensional beamsplitter comprises a two-dimensional holographic element.

9. The optical pickup assembly as defined in claim 1 wherein the plurality of reading beams are arranged such that they illuminate multiple adjacent data tracks.

10. The optical pickup assembly as defined in claim 1 wherein the plurality of reading beams are aligned in at least three rows.

11. The optical pickup assembly as defined in claim 10 wherein adjacent ones of the plurality of reading beams are staggered between the at least three rows.

12. The optical pickup assembly as defined in claim 1 wherein the plurality of reading beams are arranged so that they illuminate a plurality of non-adjacent groups of adjacent data tracks.

13. The optical pickup assembly as defined in claim 12, wherein the plurality of reading beams are arranged so that they simultaneously illuminate first and second groups of five adjacent data tracks per group, the first and second groups separated by a non-illuminated group of five adjacent data tracks.

14. The optical pickup assembly as defined in claim 12, wherein the plurality of reading beams are arranged so that they simultaneously illuminate three groups of five adjacent data tracks per group, the groups separated from each other by non-illuminated groups of five adjacent data tracks per group.

15. The optical pickup assembly as defined in claim 12, wherein the plurality of reading beams are arranged so that they simultaneously illuminate four groups of five adjacent data tracks per group, the groups separated from each other by non-illuminated groups of five adjacent data tracks per group.

16. A method for simultaneously reading multiple data tracks of an optical storage medium comprising steps of:

provividing a photodetector having a plurality of elements;

generating an illumination beam;

splitting the illumination beam using a two-dimensional beamsplitter to generate a plurality of reading beams aligned in two or more non-collinear rows;

focusing the plurality of reading beams onto a surface of the optical storage medium so that each one of the plurality of reading beams projects a spot onto a corresponding one of the data tracks;

collecting reflected illumination from the surface of the optical storage medium comprising light reflected from the multiple data tracks; and focusing the reflected illumination onto the plurality of elements of the photodetector to generate data signals representing data stored in the corresponding data tracks.

17. An improved optical disk reading apparatus for simultaneously reading a plurality of data tracks of an optical disk, the optical disk reading apparatus comprising an objective lens, and a plurality of detector elements, each one of the plurality of detector elements receiving reflected illumination from a surface of the optical disk and generating a data signal representing data stored in a corresponding data track, the improvement comprising:

a two-dimensional beamsplitter generating a plurality of reading beams from an illumination beam, the reading beams arranged so they are aligned in at least two non-collinear rows, the objective lens focusing the plurality of reading beams onto the surface of the optical disk so that each one of the plurality of reading beams illuminates a corresponding one of the data tracks, wherein the plurality of detectors are aligned to receive illumination reflected from the surface of the optical disk corresponding to the plurality of reading beams.

18. The optical disk reading apparatus as defined in claim 17, wherein the means for generating a plurality of reading beams comprises a two-dimensional holographic element.

19. The optical disk reading apparatus as defined in claim 18, wherein the means for generating a plurality of reading beams arranges the reading beams to illuminate multiple adjacent data tracks.

20. The optical disk reading apparatus as defined in claim 17, wherein the means for generating a plurality of reading beams arranges the reading beams to be aligned in at least three rows.

21. The optical disk reading apparatus as defined in claim 20, wherein the means for generating a plurality of reading beams causes adjacent ones of the plurality of reading beams to be staggered between the at least three rows.

22. The optical disk reading apparatus as defined in claim 17, wherein the means for generating a plurality of reading beams comprises a two-dimensional diffractive element.

23. The optical disk reading apparatus as defined in claim 22 wherein the two-dimensional diffractive element comprises first and second one-dimensional diffractive elements, the first and second one-dimensional diffractive elements aligned so that an illumination beam passing through the first one-dimensional diffractive element is split into a first plurality of beams, each one of the first plurality of beams being further split into a second plurality of reading beams upon passing through the second one-dimensional diffractive element.

24. The optical disk reading apparatus as defined in claim 23 wherein the first one-dimensional diffractive element comprises a one-dimensional Dammann grating having a first number of diffractive orders, and the second one-dimensional diffractive element comprises a one-dimensional Dammann grating having a second number of diffractive orders.

25. The optical disk reading apparatus as defined in claim 22, wherein the two-dimensional diffractive element comprises a two-dimensional Dammann grating.

26. The optical disk reading apparatus as defined in claim 25, wherein the two-dimensional Dammann grating has a periodic structure in which the intersecting slits are not orthogonal, producing skewed rows of beams.

27. The optical disk reading apparatus as defined in claim 17 wherein the plurality of reading beams are arranged so that they illuminate at least a first group of adjacent data tracks and a non-adjacent second group of adjacent data tracks.

28. The optical disk reading apparatus as defined in claim 27, wherein the plurality of reading beams are arranged so that they simultaneously illuminate first and second groups of five adjacent data tracks per group, the first and second groups separated by a non-illuminated group of five adjacent data tracks.

29. The optical disk reading apparatus as defined in claim 27, wherein the plurality of reading beams are arranged so that they simultaneously illuminate three groups of five adjacent data tracks per group, the groups separated from each other by non-illuminated groups of five adjacent data tracks per group.

30. The optical disk reading apparatus as defined in claim 27, wherein the plurality of reading beams are arranged so that they simultaneously illuminate four groups of five adjacent data tracks per group, the groups separated from each other by non-illuminated groups of five adjacent data tracks per group.

* * * * *